United States Patent [19]

Fishgal

[11] 4,284,245
[45] Aug. 18, 1981

[54] MACHINE LUBRICATION SYSTEM

[76] Inventor: Semyon I. Fishgal, 1908-35 High Park Ave., Toronto, Ontario, Canada, M6P 2R6

[21] Appl. No.: 34,906

[22] Filed: May 1, 1979

[51] Int. Cl.³ .............................................. B02C 19/06
[52] U.S. Cl. .................................... 241/40; 184/6.21; 241/5; 241/30
[58] Field of Search ....................... 241/5, 39, 40, 301, 241/30; 184/6.21, 6.24; 310/90, 89, 40 R; 208/179; 210/168, 173

[56] References Cited

U.S. PATENT DOCUMENTS

| | | | |
|---|---|---|---|
| 2,976,864 | 3/1961 | Ford | 184/6.24 X |
| 3,275,148 | 9/1966 | Vicino | 210/168 |
| 3,876,156 | 4/1975 | Muschelknautz et al. | 241/40 X |
| 4,028,247 | 6/1977 | Yessaian | 210/168 X |
| 4,140,281 | 2/1979 | Fulghum, Jr. et al. | 241/40 X |

*Primary Examiner*—Mark Rosenbaum

[57] ABSTRACT

A machine lubrication system including a lubricant pressure line communicated with a lubricant reservoir by means of a nozzle provided with a hydrodynamic means to break-down solid contaminants of lubricant to a non-interferring size.

3 Claims, 6 Drawing Figures

U.S. Patent  Aug. 18, 1981  4,284,245
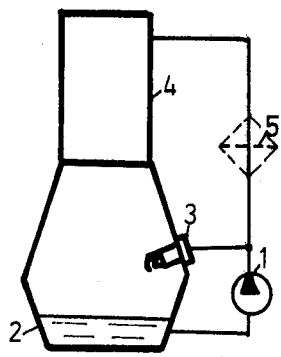
FIG. 1
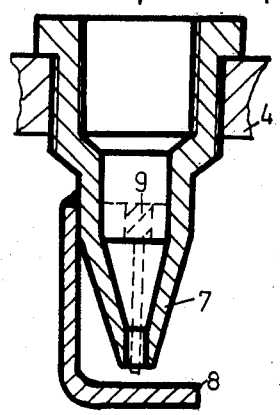
FIG. 2
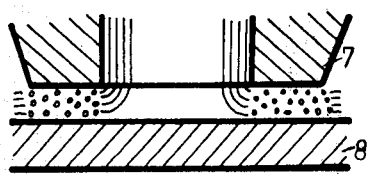
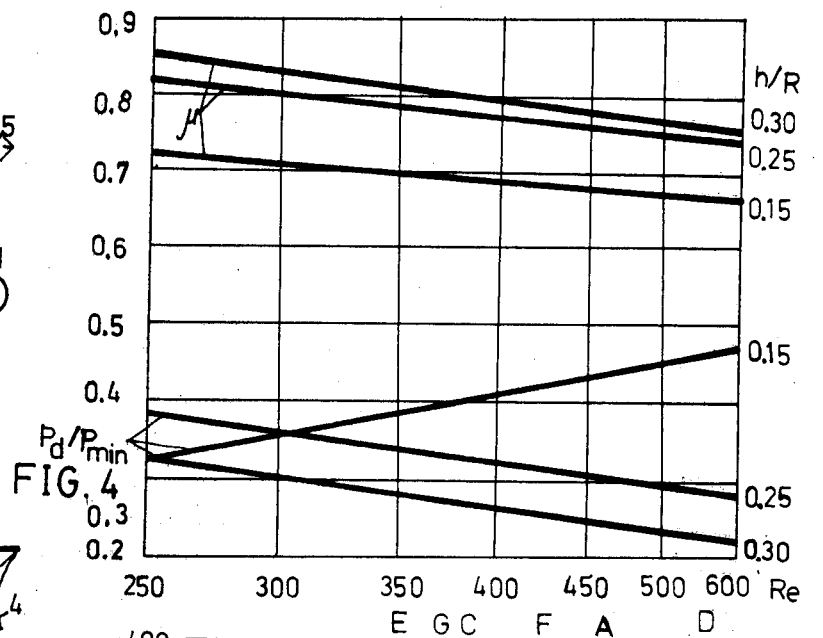
FIG. 4
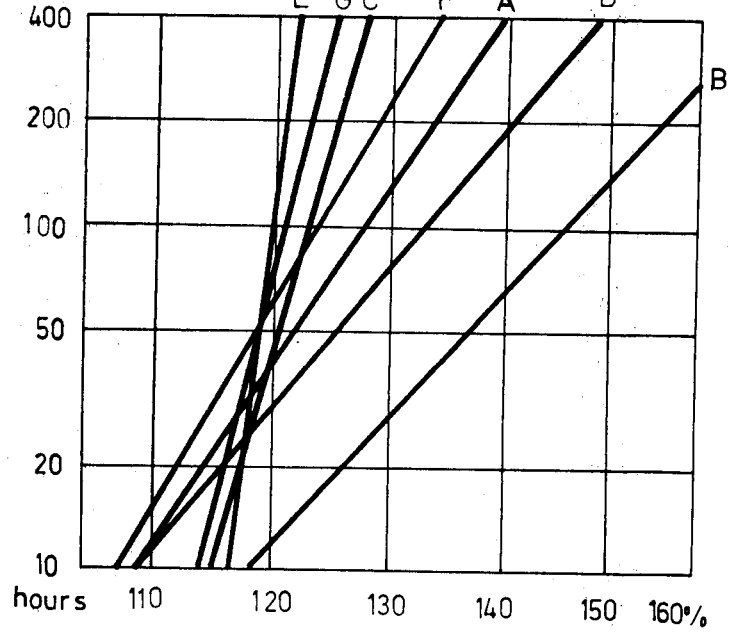
FIG. 6
FIG. 3
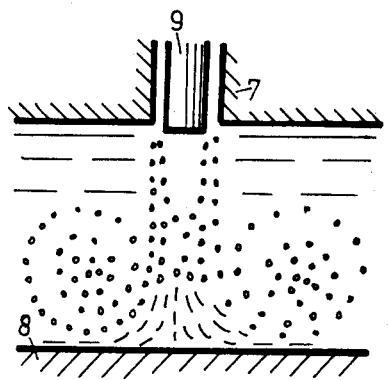
FIG. 5

MACHINE LUBRICATION SYSTEM

BACKGROUND OF THE INVENTION

This invention relates to machine lubrication systems of engines, compressors and the like machinery, including an oil-like-lubricant pressure line communicated with a reservoir by means of a means for maintaining the working properties of the lubricant.

The latter means in known such systems (C. F. Taylor, The Internal Combustion Engine in Theory and Practice, The MIT Press, Cambridge, Massachusetts, 1966; K. Abrosimov, A. Bromberg, F. Katayev, Road-Making Machinery, Mir Publishers, 1971; M. Khovakh, Motor-Vehicle Engines, Mir Publishers, 1971; B. Gelman and M. Moskvin, Farm Tractors, Mir Publishers, Moscow, 1975; U.S. Pat. Nos. 3,400,285, 3,356,182, etc.) removes solid contaminants from lubricant by filtering, straining, gravitational displacement, centrifugal separation, etc. with full-flow and bypass (5–20% of the flow).

This removing is very important because the reliability and longevity of both lubrication systems and the machines they take care of depend on the working properties of the lubricant in many respects. These properties are determined by the presence of solid, gaseous and liquid contaminants in lubricant, the state of their dispersion and fineness.

The solid contaminants are the products of wear and oxidation of both the details and lubricant, or are the dust from the atmosphere. The solid contaminants are abrasive, cause wear, decrease the term of unit service, can wedge movable details (especially plunger ones) and cause inoperativeness of automatic controls.

Above known means being unable to remove all the contaminants from lubricant are assumed to be qualified if the size of the removed solids is more than the clearance in the sliding pairs of the machinery, although the gaseous and liquid contaminants are left in lubricant. Fine-mesh bypass filters used in many cases are much-energy-consuming, require their frequent changes because of their clogging and becoming a repository for biological growth in some areas.

Gaseous contaminants (air, carbon dioxide, sulphur dioxide, water vapor, etc.) are absorbed from the atmosphere or from their internal source (e.g. incomplete combustion process). If unsolved, they deteriorate the pliability, triggering and stability of lubrication systems and can cause their inoperativeness.

Some gaseous contaminants (e.g. sulfur dioxide) form acids (causing corrosion) with water. Besides, oxygen solubility in liquid is higher than that of atmosphere air, dissolved air containing 40–50% more oxygen. This intensifies oxidation of oil and details.

Also, the gas form foam decreasing lubrication ability and causing corrosion of details and oxidation and other chemical reactions in oil because of bigger interface and more oxygen content. In time the stable foam forms viscous contaminants depositing on detail surfaces. The foamforming is sharply increased by the presence of water (even at only 0.1%).

Gas is always present in liquid, at least dissolved, and usually does not affect the mechanical properties of liquid. However, vibration, decreasing pressure and heating give the gas off (even with foaming) and form the inoperative mixture instead of former solution fitted for work. That is why the problem especially arises in lubrication systems of vehicles when the systems remaining inoperative are subjected to jarring and vibration if there is an auxiliary engine.

The main representatives of liquid contaminants are water coming into tank in its vapor form and condensing when the temperature drops, and fuel which can come into lubrication systems from combustion chambers or because of leakage.

The effect of water is above foaming. Fuel volatile, its effect is that of gaseous contaminants.

In spite of described deterioration by gaseous and liquid contaminants, most lubrication systems have only solids-filtering devices ignoring other contaminants.

SUMMARY OF THE INVENTION

The objective of the present invention is decontamination from all the contaminants and relieving the requirements to filtration not only without increasing harmful effects of contaminants, but with improving the working properties of both the lubricants and machinery. The most impressive economical effect is achieved in internal combustion engine applications.

Above objective is attained thanks to that said means for maintaining the working properties of lubricant constitutes a nozzle provided with a hydrodynamic means to break-down solid contaminants of lubricant to a non-interferring particle size (less than the clearance in the sliding pairs of machinery) and disperse them in the lubricant.

In the first embodiment of the invention, said hydrodynamic means constitutes a standoff plate installed at the outlet of said nozzle.

Said break-down can be also achieved by means of cavitation, with or without (the second embodiment) said plate, cavitation developing accordingly either in the gap between said nozzle said plate, or in a high-speed jet from the outlet. For cavitation break-down, the outlet should be submerged in both the cases, the nozzle shaped as a ring slot intensifying cavitation.

The dispersed particles (in most common case less than 5 mkm)

(1) improve the antifrictional properties of the rubbing components (and therefore, the mileage of engines) by means of filling the cavities of the worn or defective surfaces, smoothing and restoring the latters, extending the actual contact area, increasing heat transfer between the surfaces, reducing pressure between them and the influence of microseizure and other undesirable frictional effects;

(2) decrease the electrostatic component of wear as the particles absorb the products of oil oxidation than increase the electric conductivity of the oil lubricant;

(3) add the fire safety as electrostatic electricity accumulation is decreased for the above reasons;

(4) improve oil quality in response to silent discharges between metallic particles;

(5) improve the factors of acidity (characterizing the degree of oil oxidation) and alkalinity (characterizing undepleted additives) on 20–50%;

(6) decrease sliming on 15–30%;

(7) increase the time between oil changes at least by 2 times;

(8) decrease the deposition of carbon and varnish.

Thus, the present invention not only diminishes as it is too rigid requirements to filtration, but improves the system as a whole, increases its longevity and improves the antifrictional properties of rubbing components. Also, the non-cavitation embodiment is acomplished in such a manner that volatiles are driven off the lubricant. The dispersion action also prevents demulsification of water-oil lubricants used e.g. for marine engines.

This performance far exceeds that of conventional filter systems (e.g. bypass filters) which this invention replaces.

Tests provided by independent researchers showed at least 50% oil reduction, savings in maintenance, filter changes and vehicle down time. $125 savings on initial cost of a truck and $232 per truck p.a. in oil changes have been indicated for "International Harvester" trucks with Cummins diesel engines, the data based on 15,000 miles per annum and oil changes at 30,000 miles, instead of 15,000 miles normally used, although the oil in the 3 trucks tested could be changed after 40,000 miles or even more.

Therefore, the present invention would have considerable effect on the country's economy and her balance of payments.

BRIEF DESCRIPTION OF THE DRAWINGS

FIG. 1 is a schematic representation of a machine lubrication system of the present invention;

FIG. 2 is the design of the means for maintaining the working properties of lubricant;

FIG. 3 is the schematic diagram of the cavitation process in the nozzle-plate gap;

FIG. 4 is an exemplary graph of drainage-to-minimum pressure relationship ($p_d/p_{min}$), gap-to-nozzle relationship (h/R) and discharging coefficient ($\mu$) according to Reynolds number (Re) in the nozzle-plate gap;

FIG. 5 is the schematic diagram of producing cavitation in a nozzle with a core cavitator;

FIG. 6 is a graph with percentage lines showing the improvement of the working properties of a diesel lubrication system for the factors of acidity (line A), alkalinity (line B), sliming (line C), wear (line D), friction (line E), electroconductivity (line F) and deposition of carbon and varnish (line G).

DESCRIPTION OF THE PREFERRED EMBODIMENTS

The machine lubrication system of the present invention includes a lubricant pressure line from e.g. a pump 1 (FIG. 1), which inlet communicates with a reservoir means 2 (such as a tank or sump). The pressure line communicates with an inlet of a means 3 for maintaining the working properties of lubricant.

In FIG. 1, in way of illustration, but not in a limiting sense, the reservoir means 2 is shown as a sump positioned in the conventional manner, so that lubricant after performing its lubrication function within a machine 4, may drain into the sump. After reconditioning in the means 3, lubricant may also drain into the sump.

A conventional coarse full-flow filter can be also used in the system (shown with dash lines 5) along with the means 3 for maintaining the working properties of lubricant.

The latter means constitutes a nozzle 7 with a standoff plate 8 (FIG. 2).

Lubricant is delivered under pressure to the nozzle 7, wherein accelerated, and impacts at high speed against the plate 8. This impact breaks-down the solid contaminants, the lubricant spraying into the sump.

Thus, lubricant is atomized and heated (because of throttling in the nozzle). Atomizing and heating being principal mechanisms prevailing in many conventional degassing processes, gaseous contaminants (air, carbon and sulphur oxides, water and gasoline vapors) driven off. The degassing is caused by decreasing solubility under falling pressure in the jet, elevating temperature, increased free liquid surface and agitation bringing gases to the surface.

For minimizing turbulence and radial flow and obtaining the clean coherent jet, the nozzle 7 is polished and all changes in contour are rounded off. The nozzle design, pressure level, jet velocity, volumetric flow rate, surface condition, the standoff distance between the nozzle and plate are important for obtaining steady jets.

Existence of two thresholds of velocities (or pressure drops) should be expected: the bottom one below which destroying does not occur for most contaminants, and the upper threshold beyond which little destroying effect is gained.

The break-down effect can be also achieved by means of hydrodynamic cavitation occuring in liquid when local pressure reduces below the gas-vapor pressure. If formed cavities (gas-vapor bubbles) are subjected to a higher pressure, they collapse since the vapor within them condenses and gas dissolves.

During this process, liquid particles move to the bubble center with great speed. As a result, the kinetic energy of the colliding particles causes local hydraulic impacts accompanied by high temperature and pressure sufficient to damage the hardest material of the solid boundaries exposed to the collapsing cavities.

At high temperature, chemical acting of atmospheric oxygen (the dissolved air contains 1.5 times more oxygen), electrolitic effect and oscillations fatigue the material. In addition, hydraulic microimpacts destroy an oxidation film delaying oxidation in usual conditions.

As contaminants are the nuclei of cavitation, the pressure pulses generate right where needed (on the surfaces of solid contaminants). Thus, the energy for the destruction of solid contaminants is transferred directly to them and a minimum effective pressure is lost be energy divergence. The required energy is relatively modest, but concentrated over a small area and produces high local stresses (the peak erosion intensity and jet power vary repectively with the sixth power and the cube of jet velocity).

When cavitation occurs in a jet surrounded by the atmosphere, air leaks in the jet and cushions the collapse, the shock and destructive force consequently decreased. Therefore, to increase the destruction of solids, the ventilation of the cavities is prevented by submerging the outlet of the nozzle into lubricant in a reservoir.

The submerged jet produces cavitation at the velocity $$v = 1.41(p_{min} - p_s)0.5/(\sigma\rho), \tag{1}$$

where
  $p_{min}$ is minimum pressure;
  $p_s$ is the sum of pressures of dissolved gases and saturated vapor;
  $\rho$ is liquid density;
  $\sigma$ is cavitation number.

The force of the jet creates a high turbulent zone with a multitude of vortices around the periphery of the jet and shears surrounding liquid. Low pressures in the centers of the vortices decrease below $p_s$ and additional cavities (vortex cavitation) are formed there, erosion and dispersion effect increased.

Above jet cavitation is created by a high-speed jet without the standoff plate, but cavitation can be also produced in the nozzle-plate gap (FIG. 3) at $$h < 0.5R \text{ (e.g. } 0.1R > h > 0.01R\text{)};\tag{2}$$

$$v \geq 1.41[p_s\mu(Re, h)]V^{0.5},\tag{3}$$

where
 h is the gap;
 R is the nozzle orifice radius;
 $\mu$ is discharge coefficient, depending on h and Reynolds number Re (FIG. 4).

In many cases, cavitation can arise in regions below curves $p_d/p_{min}$ (FIG. 4) at $$Re = 2.82h[(p_{min} - p_d)]V]^{0.5}/v < 250,\tag{4}$$

where
 $p_d$ is drainage pressure;
 $v$ is kinetic viscosity of liquid.

Bubble cavitation producing vapor-gas-liquid mixture and cloudy cavitation producing pulsating bubble systems arise at $1 > \sigma > 0.5$ and create erosion, noise and vibration. The most radical means of fighting against this is transition into supercavitation (sheet cavitation with sharp interface between vapor-gas and liquid phases) with cavities closing behind the nozzle, but not on the plate ($\sigma < 0.5$).

The supercavitation regime can be easily achieved by placing a core cavitator 9 (shown with dash lines in FIG. 2) into the orifice of the nozzle 6 (FIGS. 2 and 5).

Hydrostatic pressure rise increases cavitation slamming pressure and erosion. However, sufficiently high pressure rising cavitation threshold can suppress cavitation. The optimal static pressure interval is 3-5 kgf.cm$^{-2}$.

The results of the present invention described in the Summary of the Invention for 15-20% flow through the nozzle are shown in FIG. 6.

It is obvious that many modifications and adaptations can be made without departing from the spirit and scope of the invention.

What is claimed is:

1. A system for treating a lubricating material comprising a lubricating material reservoir, a lubricating material pressure line, and a means maintaining the working properties of the lubricating material having its inlet connected to said pressure line and its outlets connected to said reservoir, said maintaining means being a comminuting device used for breaking down solid contaminants existing within the lubricating material to a predetermined size, and said comminuting device consisting of a nozzle creating a high speed cavitating jet.

2. The system of claim 1 wherein said nozzle has a ring slot outlet.

3. The system of claim 1 wherein in said outlet a stand-off plate is installed with a gap small enough to cause cavitation wherein.

* * * * *